US 12,459,520 B2

United States Patent
Attibele et al.

(10) Patent No.: US 12,459,520 B2
(45) Date of Patent: Nov. 4, 2025

(54) CONTROL OF VEHICLE ON LOOSE SURFACES

(71) Applicant: FCA US LLC, Auburn Hills, MI (US)

(72) Inventors: Pradeep Ramachandra Attibele, Ann Arbor, MI (US); Mark A Levine, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 54 days.

(21) Appl. No.: 18/457,063

(22) Filed: Aug. 28, 2023

(65) Prior Publication Data
US 2025/0074428 A1    Mar. 6, 2025

(51) Int. Cl.
  *B60W 40/06*    (2012.01)
  *B60W 10/04*    (2006.01)
  *B60W 40/105*   (2012.01)

(52) U.S. Cl.
  CPC ............ *B60W 40/06* (2013.01); *B60W 10/04* (2013.01); *B60W 40/105* (2013.01); *B60W 2520/26* (2013.01)

(58) Field of Classification Search
  CPC .... B60W 40/06; B60W 40/105; B60W 10/04; B60W 2520/26
  USPC .......................................................... 701/82
  See application file for complete search history.

(56) References Cited

U.S. PATENT DOCUMENTS

| 4,484,280 | A  | * | 11/1984 | Brugger ................ | B60W 10/18 180/197 |
| 9,002,578 | B2 | * | 4/2015  | Noumura .............. | B60W 10/04 701/1 |
| 2004/0098188 | A1 | * | 5/2004 | Priemer .................. | B60T 8/175 701/90 |
| 2007/0170667 | A1 | * | 7/2007 | Xu ....................... | B60R 21/0132 303/146 |

FOREIGN PATENT DOCUMENTS

| CN | 111775950 B | * | 2/2022 | .......... B60W 40/105 |
| CN | 114194172 A | * | 3/2022 | .............. B60L 15/20 |
| CN | 114667232 A | * | 6/2022 | .............. B60L 15/20 |
| CN | 107697060 B | * | 12/2022 | ............ B60W 10/02 |
| EP | 4108529 A1 | * | 12/2022 | .............. B60K 17/16 |
| JP | 2023111368 A | * | 8/2023 | |
| KR | 20230058241 A | * | 5/2023 | ................ B60L 7/18 |
| WO | WO-2022085168 A1 | * | 4/2022 | .............. B60L 15/20 |

* cited by examiner

*Primary Examiner* — Hung Q Nguyen

(74) *Attorney, Agent, or Firm* — Jeremy J. Klobucar

(57) ABSTRACT

A method for controlling a prime mover of a vehicle traveling on a surface including loose particles includes the steps of determining a vehicle speed and a rotational speed of a vehicle wheel. Then comparing the vehicle speed to the rotational speed of the vehicle wheel and if the difference between the rotational speed of the vehicle wheel and the vehicle speed is greater than a threshold, then reducing the power provided to the wheel to maintain the difference between the rotational speed and the vehicle speed within the threshold.

16 Claims, 3 Drawing Sheets

CONTROL OF VEHICLE ON LOOSE SURFACES

FIELD

The present disclosure relates to a method that allows for efficient travel of a vehicle on loose driving surfaces.

BACKGROUND

When driving on loose surfaces such as sand, significant wheel slip often occurs resulting in high power consumption. Often, the wheel slip is excessive and only results in a marginal increase in vehicle speed if any. By reducing excessive wheel slip without significantly decreasing vehicle speed, a vehicle can be operated more efficiently, reducing the power consumption and increasing the vehicle's range of travel.

SUMMARY

In at least some implementations, a method for controlling a prime mover of a vehicle traveling on a surface including loose particles may include a step of determining a vehicle speed and a rotational speed of a vehicle wheel. Then comparing the vehicle speed to the rotational speed of the vehicle wheel and if the difference between the rotational speed of the vehicle wheel and the vehicle speed is greater than a threshold, then reducing the power provided to the wheel to maintain the difference between the rotational speed and the vehicle speed within the threshold.

In at least some implementations, the vehicle speed is determined with one or both of an accelerometer and a location sensor.

In at least some implementations, the vehicle speed is determined with both an accelerometer and a location sensor, and the values from both is filtered to provide a filtered vehicle speed, and wherein, in the comparing step, the filtered vehicle speed is compared to the rotational speed of the vehicle wheel.

In at least some implementations, the threshold is a predetermined amount of wheel slip.

In at least some implementations, vehicle speed is determined from an accelerometer, a GPS device, and a Kalman filter.

In at least some implementations, a brake may be actuated to decrease the rotational speed of the vehicle wheel.

In at least some implementations, vehicle speed is determined at least in part with a GPSRTK or DGPS device.

In at least some implementations, the threshold may be changed to adapt to changing vehicle or environmental factors.

In at least some implementations, prime mover power output is not reduced to beyond a minimum amount required to maintain current vehicle speed.

In at least some implementations, a method for controlling a prime mover of a vehicle traveling on a surface including loose particles, the method includes determining a vehicle speed and a power output of a prime mover. Determining a magnitude of power output of the prime mover from which an increase in the power output of the prime mover does not result in an increase in vehicle speed beyond a threshold, and then reducing the power output of the prime mover to or below said magnitude.

In at least some implementations, the vehicle speed is determined with one or both of an accelerometer and a location sensor.

In at least some implementations, the vehicle speed is determined with both an accelerometer and a GPS device, and the values from both are filtered.

In at least some implementations, vehicle speed is determined from an accelerometer, a GPS device, and a Kalman filter.

In at least some implementations, a brake may be actuated to decrease a rotational speed of a wheel.

In at least some implementations, the vehicle speed is determined with a GPSRTK or DGPS device.

In at least some implementations, prime mover power output is not reduced beyond a minimum amount required to maintain current vehicle speed.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
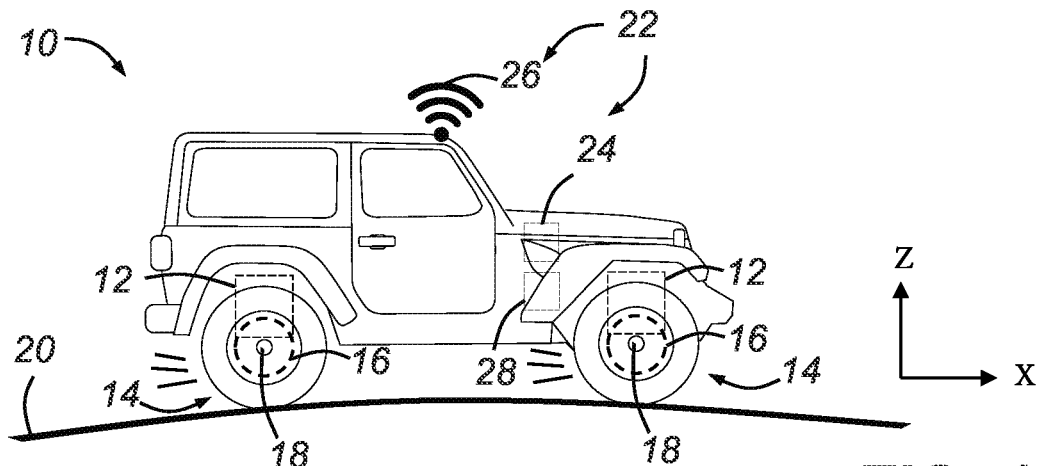
FIG. 1 is a diagrammatic view of a system for detecting vehicle speed and wheel speed, showing a side view of a vehicle and a remote location device.

Referring in more detail to the drawings, FIG. 1 illustrates a vehicle 10 that has one or more prime movers 12 coupled to one or more wheels 14 to drive the wheels 14 and move the vehicle 10. The vehicle 10 may include one or more brake assemblies 16 coupled to the wheels 14 to slow or stop the vehicle 10.

Each wheel 14 may have a wheel speed sensor 18 that provides an output indicative of the rotational speed of the wheel 14. For example, the wheel speed sensor 18 may monitor the time of one complete revolution of the wheel 14. This measurement when combined with other information such as the circumference or diameter of the wheel 14, allows for the calculation of a rotational speed of the wheel 14. In at least some implementations the wheel includes a tire configured to contact the driving surface 20. The rotational speed of the wheel 14 may be calculated to be the velocity of the outermost portion of the wheel 14 that is in contact with the driving surface 20.

The one or more prime movers 12 may be electric motors, an internal combustion engine, both of these, or other vehicle propulsion system. The prime movers 12 may be coupled to the wheels 14 in varying configurations. For example, one prime mover 12 may be directly connected to one or more of the wheels 14 such that the prime mover 12 directly drives one or more wheels 14. In other embodiments the prime mover 12 may be coupled to one or more wheels 14 through additional drivetrain components such as differentials. In further embodiments, multiple prime movers 12 may be each coupled to one or more wheels 14 either directly or through other drivetrain components. In yet another embodiment, a separate prime mover 12 may be coupled to each wheel 14 such that each wheel 14 is powered independently. In at least some embodiments, the prime movers 12 may be coupled to the wheels 14 through a differential that is capable of selectively distributing either the entirety or a portion of the prime movers' power output between the wheels 14. In embodiments containing multiple prime movers 12, the power output of each prime mover 12 may be controlled independently from each other, allowing the vehicle 10 to selectively distribute power between the prime movers 12.

The vehicle 10 may include brake assemblies 16 of any suitable type, for example, a disc or drum type brake assembly. The brake assemblies 16 may contain a friction member that is configured to frictionally engage a surface coupled to the wheel to slow or stop the rotation of the wheel 14, thus slowing or stopping the motion of the vehicle 10.

The vehicle 10 also may include a vehicle speed sensor 22 from which a speed of travel of the vehicle 10 along the driving surface 20 can be determined. The vehicle speed sensor 22 may be independent of the wheel speed sensors 18 so that vehicle speed can be determined independently of the rotational speed of the wheels 14. In at least some implementations, the vehicle speed sensor 22 may include a location sensor and/or an accelerometer.

In at least some implementations, the vehicle speed sensor 22 may include or be defined by an accelerometer such as an inertial measuring unit (IMU 24) that may be used to determine the instantaneous acceleration of the vehicle along one or more axes. The IMU 24 may contain a multiple-axis accelerometer measuring acceleration in various directions. In at least some embodiments, the IMU 24 contains a three-axis accelerometer to measure acceleration in the vehicle's X, Y, and Z directions. The X-axis or direction may be a longitudinal direction extending from the front to the rear of the vehicle 10, the Y-axis of direction may be a lateral direction extending between left and right sides of the vehicle, and the Z-axis or direction may be a vertical direction, perpendicular to the ground. In at least some embodiments, the IMU 24 contains a six-axis accelerometer to measure acceleration in the vehicle's X, Y and Z directions and to measure rotation about the X-axis (roll), rotation about the Y-axis (pitch), and rotation about the Z-axis (yaw). In other implementations, an IMU 24 containing an accelerometer with more or less than three axes may be used to determine vehicle acceleration.

In at least some implementations, the vehicle speed sensor 22 may include or be defined by a global positioning system (GPS 26) including a GPS unit 26 in the vehicle 10. The GPS unit 26 permits determination of the location and changes in location of the vehicle 10. By comparing two or more locations of the vehicle 10 and the time at which the GPS 26 determined each location, the speed that the vehicle 10 traveled between the two or more locations can be calculated by dividing the distance between the locations by the time it took to reach each location. In at least some implementations, the vehicle 10 may use differential GPS (DGPS) or GPS with real time kinematic positioning (GPSRTK) to determine the location of the vehicle 10. Both DGPS and GPSRTK may determine the location of the vehicle 10 with increased accuracy. Thus, the accuracy of vehicle speed and acceleration calculations from the DGPS or GPSRTK location data may be improved compared to other systems.

Figure 2:
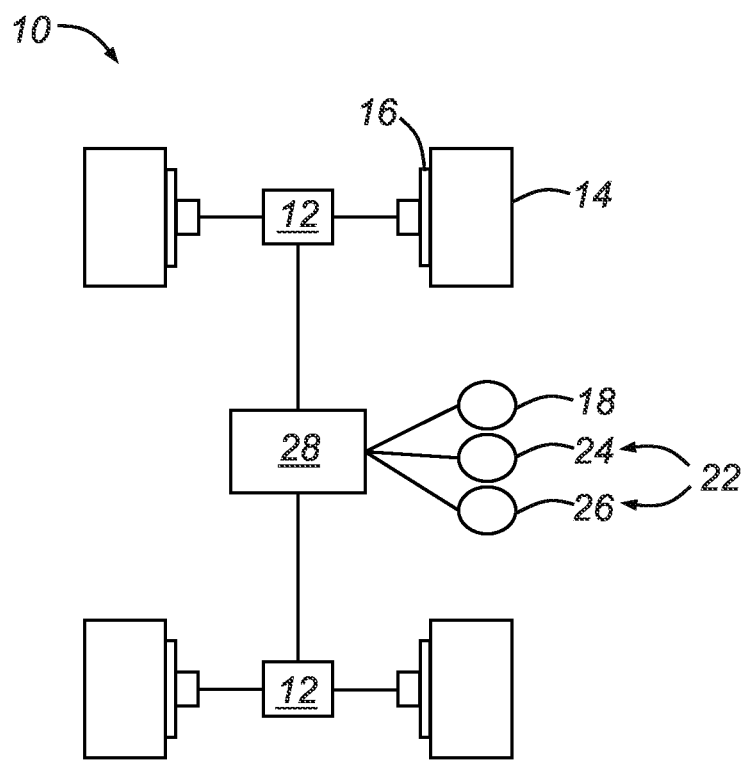
FIG. 2 is a diagrammatic view of vehicle components.

Referring in more detail to FIG. 2, the vehicle may also include a controller 28 that is communicated with the vehicle speed sensor(s) 22 and the wheel speed sensors 18, among other things. Various mathematics techniques and algorithms can be applied to determine vehicle speed from both the vehicle position data from the GPS 26 and the vehicle acceleration data from the IMU 24. For example, the derivative of the vehicle position data taken over a period of time can give the vehicle speed. Also, the integral of the acceleration data taken over a period of time may give the vehicle speed. However, the data may contain inaccuracies from noisy output signals caused by, vibrations, electrical noise and imperfect hardware or software.

To minimize the impact of noise and other sources of inaccuracies in vehicle speed calculations from a location sensor, like GPS 26, and from an accelerometer, like the IMU 24, in at least some implementations the controller 28 filters the data from both sensors 24, 26. The filter used may be configured to combine the vehicle speed data from more than one source, and reduce noise and outliers from the data. In some implementations, the controller 28 may use a Kalman filter to combine the inputs from the GPS 26 and IMU 24 to determine a filtered vehicle speed. A Kalman filter is an algorithm that combines data from multiple sources and uses estimation techniques to reduce noise, thus, outputting a more accurate data set. In this way, the vehicle speed can be determined without use of the wheel speed sensors 18, because the wheel speed does not always closely relate to vehicle speed especially when driving on loose sand and similar surfaces.

For example, when driving on a loose or low-friction driving surface 20, like sand or mud, the rotational speeds of the wheels 14 often exceed the vehicle speed due to wheel slip, that is, rotation of the wheel 14 relative to the driving surface 20 on which they are located. Due to the low-friction driving surface 20, it is possible that increasing the wheel speed will not result in a commensurate or significant increase in vehicle speed. However, increasing the wheel speed will require an increase in power output from the prime movers 12 and an increase in power consumption. Because vehicles 10 have a limited supply of energy, efficient use of the energy supply can increase vehicle range while excessive use of the energy supply will decrease vehicle range. Therefore, in an environment where wheel slip is likely, the efficiency and range of the vehicle 10 can be increased by reducing the rotational speed of the wheels 14 or limiting the slipping or spinning of the wheels relative to the driving surface, to more efficiently maintain a certain vehicle speed. Decreasing the rotational speed of the wheels 14 may be accomplished by decreasing the power output of the prime mover 12, thus decreasing power consumption and extending the range of the vehicle 10.

In some embodiments, the controller 28 may compare the vehicle speed to the rotational speed of the wheels 14 and if the difference between the rotational speed of the one or more wheels 14 and the vehicle speed is greater than a threshold, the controller 28 will reduce the power provided to those wheels 14 to maintain the difference between the rotational speed and the vehicle speed within the threshold. The threshold may be determined from known frictional properties of the wheel 14 or based on data previously collected by the vehicle 10 such that the threshold can adapt to changing vehicle or environmental factors. Vehicle factors may include the type of tire, air pressure of tire, expected vehicle range or other factors that may affect vehicle driving. Environmental factors may include the type of surface the vehicle 10 is driving on (e.g. particle size/ shape/friction), ambient temperature, moisture content of the surface or other factors that may affect available friction between the wheels 14 and the driving surface 20.

For typical driving on a paved road, the tire characteristics are such that as tire slip increases, the tractive force of the tires increases up to about 15% to 20% slip rate, and then the tractive force decreases. At its peak, the traction coefficient may be as high as 1.0 and may drop to about 0.7 as slip increases. On sand, however, the tractive forces/traction coefficient are different. On sand, the tractive coefficient increases as slip increases, reaching values, for example, of 0.3 to 0.6 (depending on the type of sand, moisture content, etc), at about 20% slip. As the slip rate increases beyond 20% (in this example), the increase in traction is minimal, perhaps increasing by another 0.05 or less at 100% slip (which is when the wheels 14 spin without forward movement of the vehicle 10), or it may even decrease by some amount in some implementations. This means that while tractive forces do not increase with increased slip, wheel power, which is the product of tractive force and wheel speed, does increase significantly. This leads to greater power consumption and a significant decrease in vehicle range while driving on sand or other lower traction surfaces. In this context, a slip rate or slip percentage is determined based on a difference between the actual vehicle speed and the vehicle speed indicated by the rotational speed of the wheels 14, if the wheels 14 were not slipping, or rotating relative to the surface they are on.

In view of this, the systems and methods may be implemented with a threshold that maintains the slip rate within the range that provides a desired traction without excessive power consumption. In some implementations, the threshold may be a predetermined amount of wheel slip. In at least some implementations, the threshold may be set to a slip rate between 15% and 25%. The actual threshold may be predetermined or determined/learned based on the driving surface 20 the vehicle 10 is currently on. That is, the system may learn where an appropriate threshold is based on the vehicle speed achieved at different slip rates, i.e. whether providing increased power achieved a significant increase in vehicle speed or not, and may set the threshold accordingly. A different threshold may be set if different conditions are encountered, and/or with use of different tires having different friction/traction characteristics. In this way, the system may adapt and self-adjust to achieve more efficient vehicle speeds as a function of power input to the prime mover(s) 12 on a range of surfaces and with different tires. In this way, power can be more efficiently provided to the wheels 14, vehicle range can be increased while still permitting an engaging and enjoyable driving experience.

Figure 3:
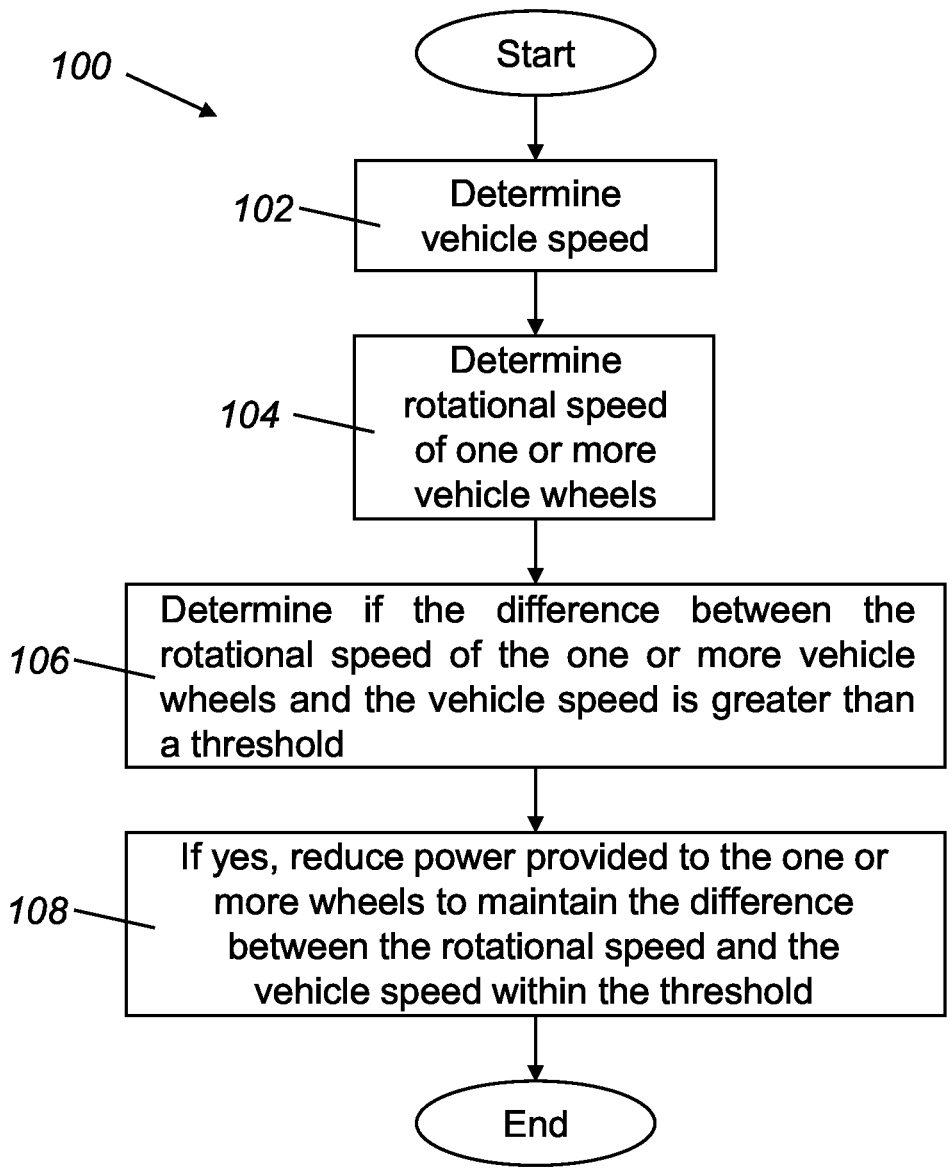
FIG. 3 is a flow chart of a method for controlling a prime mover of a vehicle traveling on a surface including loose particles.

Referring to FIG. 3, a flowchart for a method 100 for controlling a prime mover 12 of a vehicle 10 traveling on a surface 20 including loose particles is shown. The method may include more or fewer steps and may be implemented in different ways. In step 102 the vehicle speed is determined. As noted herein, this may be accomplished by a vehicle speed sensor 22 which may include a location sensor like a GPS unit 26, an accelerometer like an IMU 28, or through other things. In at least some embodiments, the vehicle speed is determined with both a location sensor and an accelerometer, and the values from both are filtered, such as by a Kalman filter, to provide a filtered vehicle speed.

In step 104 the rotational speed of one or more vehicle wheels 14 is determined, which may be done with the wheel speed sensors 18, however, other means of determining a rotational speed of a vehicle wheel 14 are possible and can be used. For example, the rotational speed of the prime mover 12 combined with the drive ratio of any differential or gearbox of the vehicle 10 could be used.

Next, in step 106 the vehicle speed is compared to the rotational speed of the one or more vehicle wheels 14 to determine if the difference between the rotational speed of the one or more vehicle wheels 14 and the vehicle speed is greater than a threshold. If it is, then in step 108 the power provided to the one or more wheels 14 is reduced to maintain the difference between the rotational speed and the vehicle speed within the threshold. In at least some implementations prime mover power output is not reduced beyond a minimum amount required to maintain current vehicle speed. In some implementations, the brake 16 may be actuated to decrease the rotational speed of one or more vehicle wheels 14. For example, if there is a significant difference in slip between the left and right wheels 14 on the same axle, the brakes 16 may be used to limit slip. Furthermore, if the rotational speed of one or more vehicle wheels 14 is significantly greater than the vehicle speed such that there is a large amount of slip, the brakes 16 may be used to quickly reduce the rotational speed of one or more vehicle wheels 14. All four wheels may have wheel speed sensors, and all four wheel speed signals can then be used in the calculations. If each axle is driven by a single motor, then there would be a differential between the wheel on each axle, and each wheel on an axle may be slipping at different rates. The difference between the true vehicle speed and the average of the rotational speeds of the two wheels on an axle can be used to give the wheel slip (e.g. an average wheel slip). However, if the two wheel slips are different then braking could be used to ensure that the wheel slips of the two wheels on the same axle are similar. If the two wheels are independently driven by two different electric motors, then the slip speeds can be controlled individually. Further, in a configuration where a single motor is used to drive all four wheels (similar to an IC engine vehicle), the same points apply-some braking can be used if wheel speeds are vastly different to bring wheel slip of different wheels to a similar value.

Figure 4:
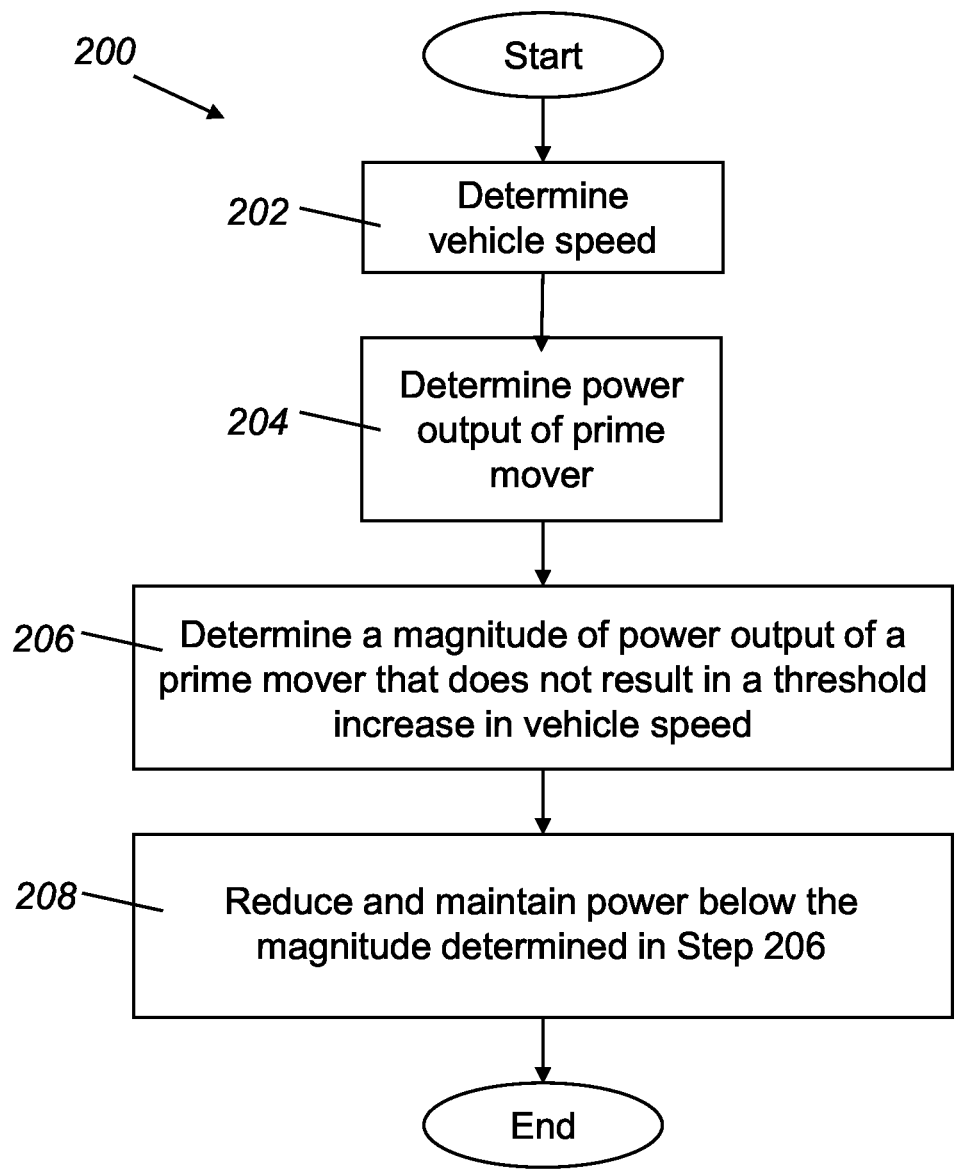
FIG. 4 is another flow chart of a method for controlling a prime mover of a vehicle traveling on a surface including loose particles.

Referring to FIG. 4, another implementation of a method 200 for controlling a primer mover 12 of a vehicle 10 traveling on a surface including or comprised of loose particles is shown. This method 200 may include more or fewer steps and may be implemented in different ways. The method may include a step 202 of determining the vehicle speed and a step 204 of determining the power output of a prime mover 12. The power output of the prime mover 12 may include measuring the voltage and current draw or power consumption of the prime mover 12 which may be correlated to the power output of the prime mover 12. The power output and/or rotational speed of an output of the prime mover 12 (e.g. an output shaft of an electric motor) could be directly measured, or determined by other means. Further, efficiency maps of the vehicle power inverter and the electric motors can be determined/known at each operating point (speed and torque) and the wheel power will be the difference between the battery power to the electric drive unit and the losses in the propulsion system.

The method may include a step 206 of determining a magnitude of power output of a prime mover 12 that does not result in a threshold increase in vehicle speed, and then 208 reducing and maintaining the power output of the prime mover 12 below the magnitude determined in step 206. This step 208 may decrease prime mover power output such that the prime mover output is not reduced beyond a minimum amount required to maintain current vehicle speed. In some implementations, the brake 16 may be actuated to decrease the rotational speed of one or more vehicle wheels 14. For example, if the magnitude of power output of a prime mover 12 that does not result in a threshold increase in vehicle speed is above a predetermined amount, the brakes 16 may be applied to one or more wheels 14 to quickly decrease the power outputted to the wheels 14. In some implementations, the brakes 16 may be used in combination with a reduction in prime mover power output to slow the rotational speed of one or more vehicle wheels 14 and/or reduce the power output to one or more vehicle wheels 14.

With the systems and methods disclosed herein, a slip rate of wheels 14 on a lower friction, loose surface can be controlled to more efficiently utilize vehicle power while driving the vehicle 10. This can dramatically increase the range of the vehicle 10 without decreasing vehicle speed or significantly reducing driving enjoyment and vehicle responsiveness. The systems may work particularly well with vehicles 10 having one or more electric motors as the prime mover 12 due to the quick response time of electric motors which would greatly improve the system response and accuracy as compared to a combustion engine wherein torque response is slower. Further, in at least some implementations, the systems and methods may be selectively actuated by a user, such as by activating a sand or low-friction driving mode, so the user can control when wheel slip is controlled and the user can drive with more wheel slip when desired.

What is claimed is:

1. A method for controlling a prime mover of a vehicle traveling on a surface including loose particles, the method comprising the steps of:
   determining a vehicle speed with both an accelerometer and a location sensor, and wherein the values from both are filtered to provide a filtered vehicle speed;
   determining a rotational speed of a vehicle wheel;
   comparing the filtered vehicle speed to the rotational speed of the vehicle wheel and if the difference between the rotational speed of the vehicle wheel and the vehicle speed is greater than a threshold, then reducing the power provided by an electric motor to the wheel to maintain the difference between the rotational speed and the vehicle speed within the threshold.

2. The method of claim 1 wherein the threshold is a predetermined amount of wheel slip.

3. The method of claim 1 wherein vehicle speed is determined from an accelerometer, a GPS device, and a Kalman filter is used to provide the filtered vehicle speed.

4. The method of claim 1 wherein a brake may be actuated to decrease the rotational speed of the vehicle wheel.

5. The method of claim 1 wherein the vehicle speed is determined at least in part with a GPSRTK or DGPS device.

6. The method of claim 2 wherein the threshold may be changed to adapt to changing vehicle or environmental factors.

7. The method of claim 1 wherein the power output from the electric motor is not reduced to beyond a minimum amount required to maintain current vehicle speed.

8. A method for controlling a prime mover of a vehicle traveling on a surface including loose particles, the method comprising the steps of:
   determining a vehicle speed;
   determining a power output of an electric motor of the vehicle;
   determining a magnitude of power output of the electric motor from which an increase in the power output of the electric motor does not result in an increase in vehicle speed beyond a threshold, and then reducing the power output of the electric motor to or below said magnitude.

9. The method of claim 8 wherein the vehicle speed is determined with one or both of an accelerometer and a location sensor.

10. The method of claim 8 wherein the vehicle speed is determined with both an accelerometer and a GPS device, and the values from both are filtered.

11. The method of claim 8 wherein vehicle speed is determined from an accelerometer, a GPS device, and a Kalman filter.

12. The method of claim 8 wherein a brake may be actuated to decrease a rotational speed of a wheel.

13. The method of claim 8 wherein the vehicle speed is determined with a GPSRTK or DGPS device.

14. The method of claim 8 wherein the electric motor power output is not reduced beyond a minimum amount required to maintain current vehicle speed.

15. The method of claim 8 wherein the power output of the electric motor is determined as a function of a power of a battery provided to the electric motor and predetermined losses in a propulsion system including the electric motor.

16. The method of claim 8 wherein the power output of the electric motor is determined as a function of the current draw of the electric motor.

* * * * *